D. W. DORRANCE.

ARTIFICIAL LIMB JOINT.

APPLICATION FILED JAN. 8, 1920.

Reissued Sept. 20, 1921.

15,198.

2 SHEETS—SHEET 1.

Inventor

David W. Dorrance,

834

E. Stevens Talbert

Attorney

D. W. DORRANCE.

ARTIFICIAL LIMB JOINT.

APPLICATION FILED JAN. 8, 1920.

Reissued Sept. 20, 1921.

15,198.

2 SHEETS—SHEET 2.

Inventor

David W. Dorrance,

By G. Hume Talbert

Attorney

UNITED STATES PATENT OFFICE.

DAVID W. DORRANCE, OF SAN JOSE, CALIFORNIA.

ARTIFICIAL-LIMB JOINT.

15,198. Specification of Reissued Letters Patent. Reissued Sept. 20, 1921.

Original No. 1,271,448, dated July 2, 1918, Serial No. 130,739, filed November 11, 1916. Application for reissue filed January 8, 1920. Serial No. 350,220.

*To all whom it may concern:*

Be it known that DAVID W. DORRANCE, a citizen of the United States, residing at San Jose, in the county of Santa Clara and State of California, has invented certain useful Improvements in Artificial-Limb Joints, of which the following is a specification, reference being had therein to the accompanying drawings.

The invention is particularly a self-locking, detachable wrist connector or coupling for use with artificial limbs or the like.

The primary object of the invention is the provision of a connector or coupling of this character wherein latches or the like are eliminated in the fastening of the artificial hand, hook or the equivalent to the arm part of an artificial member, while said hand, hook or the equivalent may be readily and easily attached or detached with despatch at the will of the user.

Another object of the invention is the provision of a connector or coupling of this character wherein the male and female members thereof are novel in form to insure a rigid and relatively fixed joint between the parts so that such joint will not accidentally separate and yet may be readily disassembled when occasion requires without necessitating the releasing of a latch, spring or other like holding element, the elimination of which simplifies the connector or coupling and renders the same more compact and effective in use.

A further object of the invention is the provision of a connector or coupling of this character wherein the user can separate the same to allow the interchanging of the artificial member, namely a hand, for a hook or vice versa, which hand or hook when attached will be firm, rigid and positively fixed in position.

A still further object of the invention is the provision of a connector or coupling which is least susceptible to wear and which when worn, may be repaired at a minimum expense and expeditiously.

A still further object of the invention is the provision of a connector or coupling which is simple in construction, possessing few parts, and which is strong, durable, thoroughly reliable and efficient in operation and inexpensive in manufacture.

A still further object of the invention is the provision of a connector or coupling of this character wherein the utility hook, limb, or its equivalent, may be readily adjusted by the turning thereof so as to position the same for the convenience of the user, and wherein the coupling operation is effected by several turns of one of the parts for the secure fastening of the two together.

Other objects are in part obvious and in part hereinafter set forth.

The invention accordingly consists in the features of construction, combination of elements and arrangement of parts which are exemplified in the construction hereinafter described, and the scope of the application of which is indicated in the appended claims.

In the accompanying drawings.

Similar reference characters indicate corresponding parts throughout the several views of the drawings.

Figure 1:
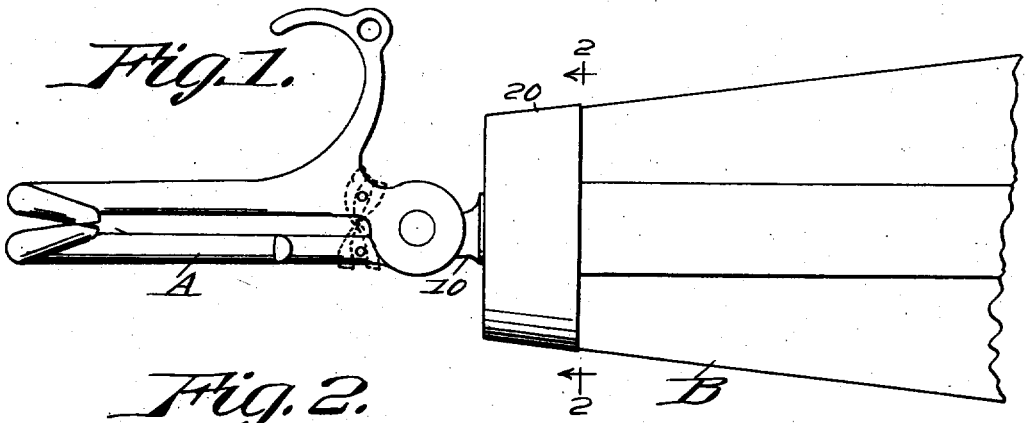
Figure 1 is an elevation of a coupling constructed in accordance with the invention.
Figure 2:
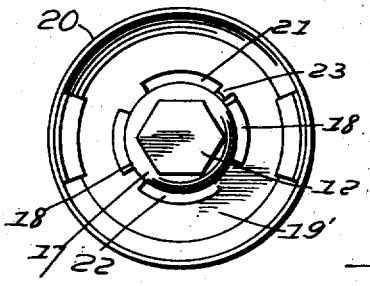
Fig. 2 is a sectional view on the line 2—2 of Fig. 1, looking in the direction of the arrows.
Figure 3:
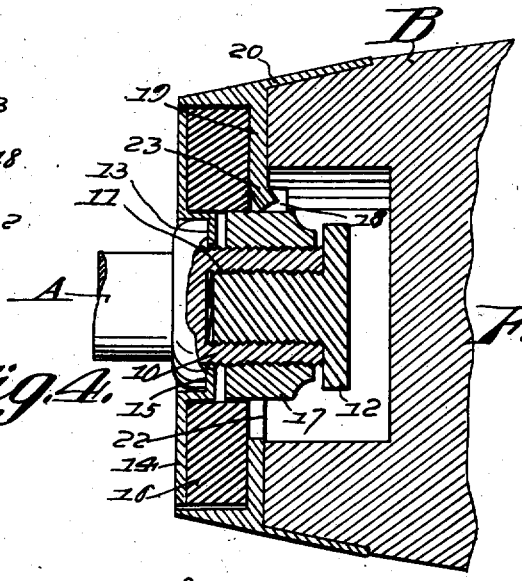
Fig. 3 is a vertical longitudinal sectional view through the coupling.
Figure 4:
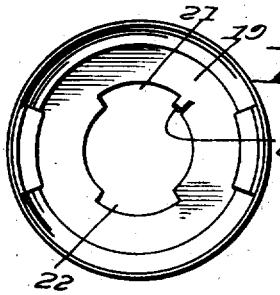
Fig. 4 is a plan view showing the female member separated.
Figure 5:
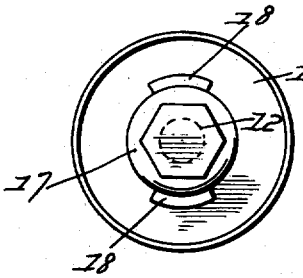
Fig. 5 is a plan view of the male member.

Referring to the drawings in detail, particularly Figs. 1 to 5, inclusive, there is shown a utility hook A, which is a substitute for an artificial hand, and the wrist part B, which is carried by the fore-arm and fastened thereto in any suitable manner, the hook A being separable from said wrist part in a manner hereinafter described.

The connector or coupling comprises male and female members which detachably connect the hook and wrist part together, the male member including an externally threaded stud or lug 10 which, in this instance, is integrally formed with the hook A and is provided with a central threaded socket 11 in which is detachably received a headed bolt 12, while loosely surrounding the stud or lug 10, concentrically of an annular shoulder 13 thereon, is a base disk 14 provided with a bearing flange 15 which engages and rests upon the shoulder 13. Supported by the base disk 14 is a resilient washer or gasket 16, preferably made from rubber and of any thickness desired. This washer or gasket, it will be observed, rests upon the seat or support provided between the base disk 14 and the bearing flange 15 and is thereby maintained concentric with the stud 10 but out of engagement with the exterior threads of the latter. Thus the eye or hole in the gasket is not subjected to undue wear as would be the case were it supported on the stud and exposed to the cutting that would result from turning movement of the stud relative to the gasket.

Adjustable upon the threaded stud or lug 10 is a lock nut 17, which, at diametrically opposite points, is formed with the segment shaped wings 18 for the locking of the nut 17 in the female member hereinafter fully described.

The female member comprises a locking web 19 which is of annular formation and is integral with the wrist part B internally thereof, the web 19 being inset from the outer end of the collar 20 of said wrist part so as to form a pocket within the latter for the reception of the washer or gasket 16 on the joining of the hook A with the wrist part B of the connector or coupling.

The web 19 is formed at diametrically opposite points in the inner periphery thereof with notches 21 and 22 respectively, which are correspondingly shaped to the wings 18 for receiving the same so that said wings will lock with the web 19 for the joining of the wrist part to the hook.

The notch 22 in the web 19 is of greater size than the notch 21, there being adjacent the latter, at one corner thereof, an abutment nib or tongue 23 which is bent inwardly at an angle to the plane of the web 19 and is adapted to engage with either of the wings 18 for the turning of the nut 17 to loosen or tighten the same by the turning thereof upon the stud or lug 10 so that the wings 18, when tightening the nut, will ride onto the web 19 after passing through the notches 21 and 22 therein to positively lock with the said web and thereby fasten the male member to the female member of the connector or coupling, the resilient washer or gasket 16 being compressed between the base disk 14 and the said web so that the hook A will be firmly and rigidly fastened to the wrist part B. When it is desired to detach the hook A the same is rotated in a reverse direction until the nib or tongue 23 engages one of the wings 18 when the said wings 18 will be brought into registration with the notches 21 to disengage the male member from the female member and thereby separate the hook A from the wrist part B, as is clearly obvious. In the uncoupling or detaching operation, it is to be noted, that there is first relative rotary and longitudinal movement between the nut 17 and the stud or lug 10, this movement continuing until the nut abuts the bolt 12 which serves as a positive stop for said movement. Then angular or rotary movement is imparted to the nut relative to the web 19 until one of its wings impacts on the nib or tongue 23 which serves as a positive stop to limit angular movement and leave the nut in the position for uncoupling. Thus there are two positive stops for the locking member which positively limit it to the unlocking position upon imparting relative angular or turning movement to the hook element A and wrist element B.

The wrist part B is mounted on the forearm of the user in any desirable manner.

Figure 6:
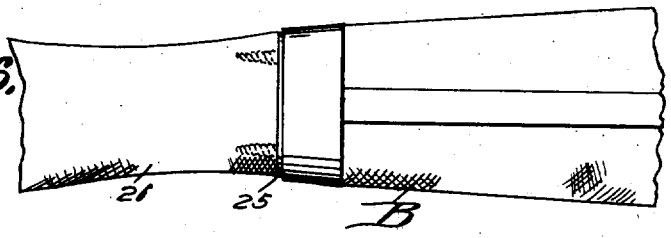
Fig. 6 is a fragmentary elevation showing a slight modification of the invention.
Figure 7:
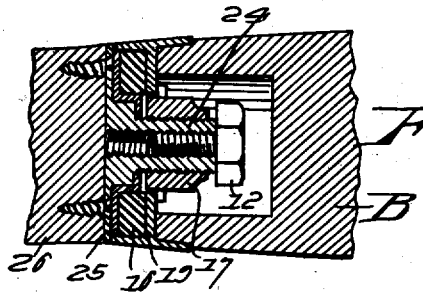
Fig. 7 is a vertical longitudinal sectional view therethrough.
Figure 9:
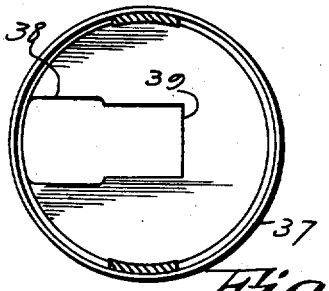
Fig. 9 is a plan view of the female member.
Figure 8:
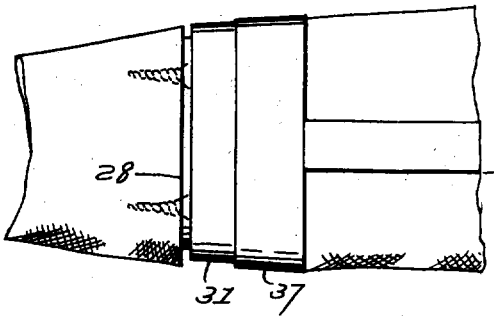
Fig. 8 is a side elevation of a still further modification of the invention.
Figure 10:
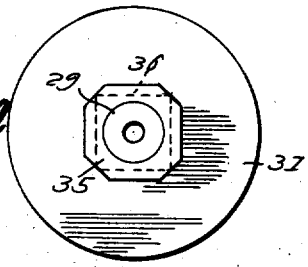
Fig. 10 is a plan view of the male member.
Figure 11:
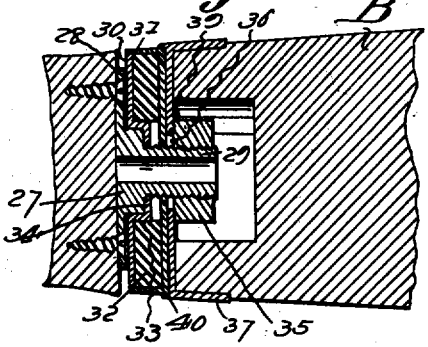
Fig. 11 is a vertical longitudinal sectional view showing the male and female members connected together.

In Figs. 6 and 7 there is shown a slight modification of the invention, wherein the stud or lug 24 is formed centrally on an attaching base or disk 25, the latter being adaptable for fastening to the stub portion 26 of an artificial hand of the solid or other type.

In Figs. 8 to 11, inclusive, there is shown a still further modification of the invention, wherein the lug 27 with its base 28 is carried by the stud 29 which is a part of the artifical limb, and loosely surrounding the lug 27 are the interfitting parts 30 and 31 of a casing in which is arranged a resilient washer or gasket 32, the part 30 being formed with a central counter-seat 33 for a shoulder 34 formed on the base 28 concentrically of the stud 29. The said shoulder constitutes a rest for the casing.

Threaded on the stud 29 is a lock nut 35 formed with a squared inner end 36 for the locking engagement thereof with the female member which comprises a cup shaped part 37 adapted to be fastened in any suitable manner to the stub of one part of the artificial limb, and the cup shaped part 37 is formed with a substantially key-hole shaped slot including the wider portion 38 and a narrower squared portion 39, the squared portion being designed to receive the squared end 36, which is correspondingly shaped thereto, when the nut 35 has passed through the wider portion 38 for connecting the male member with the female member. When the squared end 36 of the nut engages in the squared portion of the slot, on the turning of the female member, the nut will be adjusted on the stud 29 so as to have the part 37 frictionally play upon the casing which includes the parts 30 and 31 with the gasket 32 therebetween, thus securely locking the male and female members together.

The female part 37 is countersunk, as at 40 to receive the casing including the parts 30 and 31 so that when the male and female members have been tightened and locked together the said female member cannot become displaced laterally and allow accidental separation of the male and female members.

The compression of the gasket 32 between the parts 30 and 31 insures a firm frictional hold between the male and female members so as to avoid the accidental separation thereof or turning of the parts relative to each other, yet said male and female members can be readily separated or detached from each other.

A salient feature of the connector or coupling lies in the fact that the utility hook, hand or its equivalent can be readily turned for the proper positioning thereof, whereby the user can manipulate it in the execution of work in a convenient manner; and the parts of the connector or coupling can be firmly fastened together by several turns of one of its parts relative to the other. It is obvious that the members of the connector or coupling are locked together and firmly held without the use of any separate fastenings or the employment of latches, springs, push buttons or other like parts or their equivalent.

It is apparent that the resilient washer or gasket acts as a binding medium to hold the male and female members when locked together, and in event of wear of said resilient washer or gasket a new one can be substituted or filling washers or the like applied. Furthermore, should the connector or coupling require repairing or the replacing of new parts the construction thereof permit this to be done with despatch, as the parts can be readily disassembled and assembled when the occasion requires.

Although the forms of connectors or couplings hereinbefore described are especially designed for use with artifical limbs, it is to be understood that said connectors or couplings can be used in any other manner and for other purposes. Further it is to be noted that the combination of the locking means and the resilient gasket provides a semi-frictional semi-positive connection between the parts of the coupling making for the utilitarian use of the latter for many purposes.

The invention having been described, what is claimed as new and useful is:

1. A coupling of the characteer described comprising separable male and female members, said male member having a stud, a resilient gasket loose on the stud, means for supporting the gasket, and a locking member adjustable on the stud, said female member including a web for locking engagement with the locking member which is movable to effect binding action of itself and the gasket upon the web.

2. A coupling of the character described comprising separable male and female members, said male member having a stud, a resilient gasket loose on the stud, means for supporting the gasket, a locking member adjustable on the stud, said female member including a web for locking engagement with the locking member which is movable to effect binding action of itself and the gasket upon the web, and means on the stud for limiting the movement of the locking member in one direction.

3. In a coupling of the kind described, a male member, a female member, the female member being provided with a web and the male member having a base disk and a protruding externally threaded lug, a locking member mounted on the lug for both axial and angular movement thereon and insertible through an opening in the web for binding engagement with the latter, and a resilient member disposed in surrounding relation to the lug and frictionally engaging both the web and the base disk when the locking member is in binding engagement with the web.

4. In a coupling of the kind described, a male member, a female member, means for locking the members together embodying a threaded lug and a clamping element mounted thereon, resilient means binding the two said members when locked with each other, and an independent support for the resilient means to maintain the same out of contact with said threaded lug.

5. In a coupling, a male member, a female member, means actuated by one of the members for locking the two together, resilient means binding the two said members when locked with each other, and means for limiting the movement of the locking means to releasing position, said locking means comprising a nut carried by one of the members and provided with wings and a web carried by the other member and formed with notches for receiving the wings.

6. In a coupling, a male member, a female member, means actuated by one of the members for locking the two together, and resilient means binding the two said members when locked with each other, said locking means comprising a nut carried by one of the members and provided with wings and a web carried by the other member and formed with notches for receiving the wings, the web having means for engaging the wings to move the nut into locking or unlocking positions.

7. In a coupling, a male member, a female member, means actuated by one of the members for locking the two together, resilient means binding the two said members when locked with each other, said locking means comprising a threaded lug carried by one of the members and a nut mounted on said lug and provided with wings and a web carried by the other member and formed with notches for receiving the wings, the web having means for engaging the wings to move the nut into locking or unlocking positions, and a support for the resilient means to maintain the same out of contact with the said threaded lug.

8. A coupling of the character described comprising separable elements, means detachably interconnecting the same, and a locking member included in said means and mounted for limited angular movement with respect to one element and limited axial movement with respect to the other element, said member interlocking and binding the elements together and being actuatable by one of the same for release and movement to unlocking position in one operation.

9. A coupling of the character described comprising separable elements, means detachably interconnecting the same, a locking member included in said means and mounted for limited angular movement with respect to one element and limited axial movement with respect to the other element, said member being moved to detaching position upon imparting relative angular or turning movement to said elements.

10. A coupling of the character described comprising separable elements, and angularly and axially movable means carried by one of the elements and detachably interlocking and binding the two together, said means being moved to unlocking position upon relative angular or turning movement of the two elements.

11. A coupling of the character described comprising separable elements, a lock detachably securing said elements together and actuated jointly by the same to move it to locking and unlocking positions, said lock embodying a locking member and a plurality of positive stops for the same to limit said locking member to detaching position.

12. A coupling of the character described comprising a member provided with an angularly and axially movable locking device having oppositely disposed wings, a second member having an element interposed between the first said member and the locking device and engaged by the wings to secure the two members together, said element being provided with oppositely disposed notches through which the wings of the locking device may pass, and stops to limit both the angular and axial movement of the locking device to position it for passage of said wings through said notches.

In testimony whereof he affixes his signature.

DAVID W. DORRANCE.